Dec. 26, 1933.                J. K. HODNETTE                1,940,863
                            ELECTRICAL APPARATUS
                            Filed Feb. 23, 1933
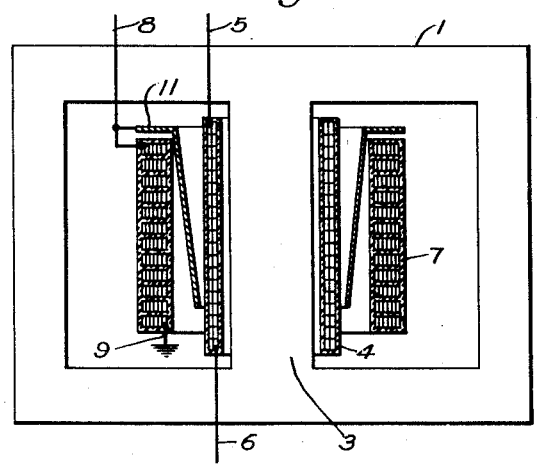
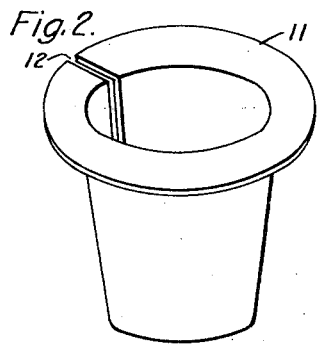
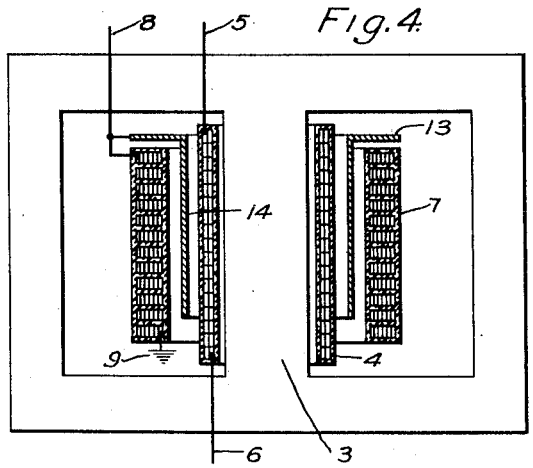
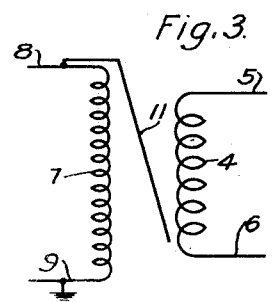
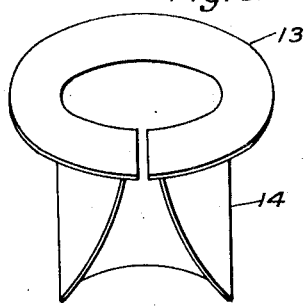
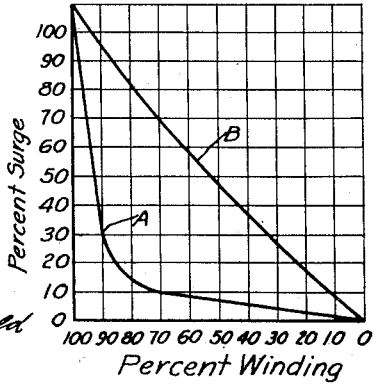
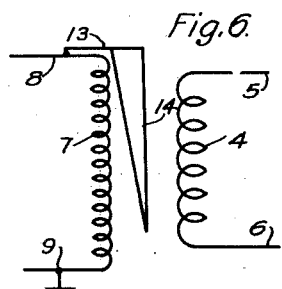
WITNESSES:
INVENTOR
John K. Hodnette
BY
ATTORNEY Patented Dec. 26, 1933

1,940,863

UNITED STATES PATENT OFFICE 1,940,863

ELECTRICAL APPARATUS

John K. Hodnette, Sharon, Pa., assignor to Westinghouse Electric & Manufacturing Company, East Pittsburgh, Pa., a corporation of Pennsylvania Application February 23, 1933. Serial No. 657,966

6 Claims. (Cl. 175—356)

My invention relates to methods of, and means for, improving the electrostatic distribution of surge voltages in the windings of electrical apparatus.

In the windings of electrical apparatus, such as transformers, that are connected to a transmission line, the voltage between the terminals of a winding varies uniformly from one end of the winding to the other under normal frequency and voltage conditions of the system. However, during certain conditions of the system, such as may be caused by lightning or by switching operations on the transmission line, a high-voltage surge may occur on the transmission line and enter the transformer windings.

In the usual construction of electrical windings, a voltage surge will not initially distribute itself along the winding in a manner to establish a uniform voltage gradient thereon, the end of the winding adjacent to the high-voltage terminal being required to withstand a much higher initial voltage between adjacent turns of the winding than the voltage between turns in other portions of the winding. This initial voltage gradient results from the values of the electrostatic conditions existing between the winding and ground, and between adjacent portions of the winding such as different winding turns.

Because of the inductance and distributed capacitance of the winding, a redistribution of the energy from the electrostatic state takes place causing oscillations of the voltage values therein about its final or uniformly distributed value. The amplitude of the oscillations will initially correspond to the difference between the initial voltage and the final voltage distribution along the winding. These oscillations create successive voltage stresses between adjacent parts of the winding and between the winding and ground.

The problem of insulating the conductors of a transformer winding to withstand the surge voltage impressed upon them is a difficult one because the usual construction of these parts, the conductors are so small that satisfactory means of applying sufficient insulation to withstand the voltage stresses are not readily available, and if sufficient insulating material is applied about the conductors the space factor between the conductors becomes so large as to adversely affect the efficiency of the design. It is, therefore, desirable to provide means for lessening the voltage stress between the several parts of the winding that are caused by the concentration of surge voltages in order to produce satisfactory operation of the apparatus.

It is an object of my invention to provide for protecting the winding of an electrical apparatus from the transient voltage distribution effect of a high-voltage surge entering the winding.

Another object of my invention is to provide electrostatic plates in an electrical apparatus so positioned and dimensioned as substantially to neutralize the capacitance current of the windings to ground upon the occurrence of a rapid change in voltage across the winding of the apparatus.

Another object of my invention is to provide means in the space between the high-voltage and low-voltage windings for supplying the capacitance current between these windings and to ground.

Other objects of my invention will appear from the following description of specific embodiments thereof when considered together with the accompanying drawing.

In the drawing Figure 1 is a vertical sectional view of a transformer arranged in accordance with one embodiment of my invention.

Fig. 2 is a perspective view of a conducting member or electrostatic plate used for establishing potentials in the dielectric between the high-voltage and low-voltage windings of the transformer in Fig. 1.

Fig. 3 is a diagrammatic representation of the windings and electrostatic plate of the transformer arranged as in Fig. 1.

Fig. 4 is a vertical sectional view of a second embodiment of the invention in which the electrostatic plate used is somewhat different in design from that employed in the embodiment illustrated in Fig. 1.

Fig. 5 is a perspective view of the electrostatic plate employed in the embodiment of the invention illustrated in Fig. 4.

Fig. 6 is a diagrammatic view of the windings and electrostatic plate corresponding to the embodiment of the invention illustrated in Fig. 4.

Fig. 7 is a diagram illustrating curves showing the initial surge voltage distribution in the transformer windings.

Referring to the drawing, and particularly to the embodiment of the invention illustrated in Figs. 1, 2 and 3 thereof, a core member 1 of magnetic material is provided, and, as illustrated in Fig. 1 may be of the three-leg type, the central leg 3 being a winding leg about which is placed a low-voltage winding 4 connected between terminals 5 and 6. A high-voltage winding 7 is positioned about the low-voltage winding and is spaced therefrom. The high-voltage winding may as shown, comprise a stack of flat coils connected together in series and may be connected between a high-voltage terminal 8 and a ground terminal 9, although, in some instances, the transformer may be operated without either of the terminals being grounded.

In order to protect the apparatus from the effect of surge voltages that would distribute themselves along the winding 7 in accordance with the curve A shown in Fig. 7, an electrostatic plate 11 is provided and is connected to the high-voltage terminal 8 of the high-voltage winding, and extends between the high-voltage end of the winding and the core and downwardly into the space between the high-voltage and low-voltage windings. This electrostatic plate is formed of electrical conducting material and substantially surrounds the low-voltage winding 4, except for the slot 12 that prevents the plate from making a complete turn about the core leg. It, therefore carries the potential of the high-voltage winding into the area between the high-voltage and low-voltage windings occupied by the plate, thus establishing electrostatic potentials in the dielectric along the length of the winding that are higher than those of the adjacent winding turns, thereby decreasing the static stress between the windings and preventing the flow of charging current from the high-voltage winding through the surrounding dielectric to the low-voltage winding and to ground.

Figs. 4, 5 and 6 illustrate a transformer having low-voltage and high-voltage windings similar to those shown in Fig. 1, and an electrostatic plate 13 having an upper flange portion that extends across the high-voltage end of the winding 7, and a body portion 14 that extends downwardly into the space between the high-voltage and low-voltage windings.

As stated above, the purpose of the electrostatic plates 11 and 13, connected to the high voltage terminal 8 in Figs. 1 and 4, respectively, and extending across the end of the high-voltage winding and between the high and low-voltage windings, is to counter-balance or neutralize the flow of capacitance current from the high-voltage winding turns to the low-voltage winding and to ground. The capacity current of the winding is dependent upon the character or permittivity of the insulation through which it passes, and is also a function of the voltage causing it to flow and of the frequency or rate of change of this voltage. The capacitance current from the winding is, therefore, not uniform but varies with the voltage of the winding above ground and with the frequency or rate of change of the voltage. The current supplied from the electrostatic plate likewise varies in accordance with its voltage above ground and with the rate of change in voltage. The capacitance current that would normally flow between a high-voltage winding turn and ground decreases as the voltage of the winding decreases. That is to say, the capacitance current to ground per winding turn is greatest at the high-voltage end of the winding and gradually decreases toward the low-voltage end of the winding. It is, therefore, necessary, in order to neutralize the capacitance current to ground, that the capacitance between the electrostatic plate and the high-voltage winding turns correspondingly diminish from the high-voltage to the low-voltage end of the winding.

This result is effected in the embodiment of the invention illustrated in Figs. 1, 2 and 3 by properly varying the distance between the electrostatic plate and the high-voltage winding, the greater distance being adjacent the low-voltage end of the winding. In the embodiment of the invention illustrated in Figs. 4, 5 and 6, the same result is obtained by varying the size or area of the plate, to decrease its width or circumference from the high-voltage end toward the low-voltage end of the winding as clearly shown in Fig. 5. The lower portion of the electrostatic plate 12 corresponds in shape to the surface of a cone while the lower portion of the electrostatic plate 13 corresponds to the surface of a cylinder, a portion of which has been cut away.

The electrostatic plate is so positioned and dimensioned that the capacitance between it and the high-voltage winding is such as to neutralize the flow of capacitance current from the high-voltage winding at a rate of voltage change corresponding to a steep front voltage surge.

In the two embodiments of the invention illustrated, the static plates 11 and 13, respectively, supply directly the capacitance current to ground and to the low voltage winding, thus eliminating the flow of this current from the high voltage winding. When a high voltage is suddenly applied to the high voltage line terminal 8, the electrostatic plate 11 or 13, that is directly connected to the line terminal, is charged to the same voltage as the terminal itself, and a charging current is supplied from the electrostatic plate to the various parts of the winding and to ground. The various parts of the winding are, therefore, raised to a potential that is determined by the capacity through which the currents from the electrostatic plate are required to flow and the capacity current through the winding proper. The electrostatic plates are so designed and positioned that the capacitance current from the plates to the adjacent turns of the high-voltage winding varies with the voltage above and the capacity to ground of these winding turns. Therefore a substantially uniform distribution of voltage throughout the high voltage winding is maintained at all times.

The initial or electrostatic voltage distribution of a steep front surge in a conventional core type winding is determined by the electrostatic or capacity network of the winding and is represented by the curve "A" in Fig. 7. The final distribution of voltage is determined by the inductance network of the winding and is practically uniform as is shown by the curve "B" in Fig. 7. The employment of my invention causes the initial voltage distribution along the high-voltage winding to correspond, substantially, to the final voltage distribution.

Many modifications may be made in the apparatus illustrated and described without departing from the spirit of my invention, and I do not wish to be limited other than by the scope of the appended claims.

I claim as my invention:

1. An electrical transformer comprising inductively related low-voltage and high-voltage windings, said high-voltage winding being spaced from and surrounding said low-voltage winding, and an electrostatic conducting member extending across one end of said high-voltage winding and substantially surrounding said low-voltage winding in the space between said windings for introducing into said space a voltage that is substantially the terminal voltage of the high-voltage winding.

2. Electrical induction apparatus comprising inductively related low-voltage and high-voltage windings, one of said windings surrounding the other of said windings, means for providing a substantially uniform dielectric field throughout the length of said windings upon the occurrence of a steep-front voltage surge comprising an electrostatic plate connected to a terminal of one of the windings and extending across the end of the winding and along the winding to supply the charging current to ground.

3. Electrical induction apparatus having inductively related low-voltage and high-voltage windings, said high-voltage winding being spaced from and surrounding said low-voltage winding, means for protecting said high-voltage winding from the effect of surge voltages comprising an electrostatic plate extending across the end of said winding and along the space between the two windings and substantially surrounding the low-voltage winding, and means independent of said windings for charging said plate to substantially neutralize the flow of charging current from said high-voltage winding upon the occurrence of a high-voltage surge.

4. In a core type transformer, a core having a winding leg, a low-voltage winding surrounding said winding leg, a high-voltage winding spaced from and surrounding said low-voltage winding and connected between a high-voltage terminal and a grounded terminal, and means for protecting said high-voltage winding from the effect of surge voltages comprising conducting means extending across the high-voltage end of said high-voltage winding and substantially surrounding said low-voltage winding in the space between the two windings and connected to said high-voltage terminal to establish electrostatic potentials in the space between the windings sufficient to decrease the static stress between the windings and substantially to prevent the flow of charging current from the high-voltage winding through the surrounding dielectric.

5. Electrical induction apparatus comprising a low-voltage winding, a high-voltage winding, and current conducting means extending across one end of the high-voltage winding and substantially surrounding said low-voltage winding in the space between the two windings to introduce into said space a voltage that is substantially the terminal voltage of the high-voltage winding, said current conducting means being so dimensioned and positioned with respect to the high-voltage winding as substantially to supply the capacitance current to ground upon the occurrence of a steep-front voltage surge and thus to neutralize the electrostatic capacitance between the two windings and between the high-voltage winding and ground.

6. In an electrical apparatus, a relatively low-voltage winding, a relatively high-voltage winding positioned about said low-voltage winding, and comprising a plurality of winding coils connected in series between line terminals, and a metallic plate connected to one of said terminals and extending across the end of the high-voltage winding and along the winding in the space between the high-voltage and the low-voltage windings.

JOHN K. HODNETTE.